United States Patent [19]
Ozawa et al.

[11] Patent Number: 4,814,936
[45] Date of Patent: Mar. 21, 1989

[54] GROUNDING TANK TYPE ARRESTER

[75] Inventors: Jun Ozawa; Katsuji Shindō; Takeuchi Shigetaka; Goro Suzuki, all of Hitachi, Japan

[73] Assignee: Hitachi, Ltd., Tokyo, Japan

[21] Appl. No.: 178,215

[22] Filed: Apr. 6, 1988

[30] Foreign Application Priority Data

Apr. 7, 1987 [JP] Japan ................................ 62-85480

[51] Int. Cl.[4] ............................................ H02H 9/04
[52] U.S. Cl. .................................... 361/127; 361/117
[58] Field of Search ................. 361/91, 117, 118, 126, 361/127

[56] References Cited

U.S. PATENT DOCUMENTS

| | | | |
|---|---|---|---|
| 3,706,009 | 12/1972 | Reitz | 361/127 |
| 4,174,530 | 11/1979 | Kresge et al. | 361/127 |
| 4,502,089 | 2/1985 | Ozawa et al. | 361/127 |
| 4,547,831 | 10/1985 | Heclmon et al. | 361/127 |
| 4,686,603 | 8/1987 | Mosele | 361/117 X |

*Primary Examiner*—Gerald P. Tolin
*Assistant Examiner*—Derek S. Jennings
*Attorney, Agent, or Firm*—Antonelli, Terry & Wands

[57] ABSTRACT

A grounding tank type arrester comprises a plurality of columns sorted into current folding columns and current pass columns. Each current folding column includes a plurality of stack sets of an element unit, having a plurality of zinc oxide elements, and an insulating spacer and the plural stack sets are stacked in regular sequence so that one element unit and one insulating spacer are stacked alternately. Each current pass column includes a plurality of stack sets of a zinc oxide element and an insulating spacer and the plural stack sets are stacked in regular sequence so that one zinc oxide element and one insulating spacer are stacked alternately. Individual zinc oxide elements on one level of individual current folding columns and individual zinc oxide elements on the one level of individual current pass columns are interconnected together by bridge conductor plates. The direction of current flowing through bridge conductor plates for connecting together zinc oxide elements on the one level of the current folding columns and current pass columns is inverse to the direction of current flowing through bridge conductor plates for connecting together zinc oxide elements on the neighboring level of the current folding columns and current pass columns and hence the residual inductance of the arrester can be reduced.

13 Claims, 4 Drawing Sheets

GROUNDING TANK TYPE ARRESTER

BACKGROUND OF THE INVENTION

This invention relates to an improved grounding tank type arrester.

In a conventionally known grounding tank type arrester such as disclosed in, for example, JP-A-55-115279, with the view of reducing the height of the arrester, a plurality of columns each including a stack in which an element made of zinc oxide and an insulating spacer are stacked alternately are arranged on a circle, the heights of individual zinc oxide elements of one column are made to slightly differ from the heights of individual zinc oxide elements of another column, and the zinc oxide elements 71 to 74 of one column and adjoining columns are sequentially interconnected together toroidally by means of bridge conductor plates 75 to 78, as illustrated in FIGS. 9A and 9B.

However, in the prior art grounding tank type arrester, because of the toroidal connection throughout the zinc oxide elements, the residual inductance of the arrester as a whole increases, raising a problem that a current passed through the arrester under the application of an impulse voltage due to thunderbolt causes a voltage across the residual inductance and the limit voltage tends to increase depending on a waveform of the developing voltage.

An arrester suggesting a way to reduce the residual inductance has been proposed as disclosed in, for example, JP-A-54-54258, according to which a plurality of zinc oxide elements are connected in series to form one block, a plurality of such blocks are connected in series to form one section and a plurality of such sections are connected in series in such a manner that the direction of current flowing through one section is inverse to the direction of current flowing through the adjoining section.

Further, for example, JP-A-53-91360 discloses an arrester wherein a plurality of columns respectively include a plurality of zinc oxide elements and zinc oxide elements included in the respective columns and being flush with each other are mutually interconnected by conductor plates.

The arresters of the above prior art references are disadvantageous in that the zinc oxide element as a constituent of each of the plural columns and the insulating spacer for insulating the zinc oxide element have different thicknesses and the number of columns constituting the arrester is limited, bottlenecking simplified and rapid production of the arrester. This invention intends to solve the above problems.

SUMMARY OF THE INVENTION

An object of this invention is to simplify and speed up the production of a grounding tank type arrester having a small residual inductance.

According to the invention, the above object can be accomplished by a grounding tank type arrester wherein (a) the difference in height between individual zinc oxide elements on one level of individual columns which are interconnected together by bridge plates and individual zinc oxide elements on the neighboring level of individual columns which are interconnected together by bridge plates is substantially identical for the respective columns; (b) individual zinc oxide elements on the one level of individual columns are sequentially interconnected together by a bridge plate between adjoining columns, starting from a first start point represented by a zinc oxide element on the one level of a column which is upstream for current flowing through the bridge plates and ending at a first end point represented by a zinc oxide element on the one level of a column which excludes the column having the first start point and which is the most downstream for the current, and individual zinc oxide elements on the neighboring level of individual columns are sequentially interconnected together by a bridge plate between adjoining columns in inverse directional relationship to the sequential interconnection set up for the one level, starting from a second start point represented by a zinc oxide element on the neighboring level of the column having the first end point and ending at a second end point represented by a zinc oxide element on the neighboring level of the column having the first start point; and (c) the zinc oxide element representing the end point is electrically connected to the downstream zinc oxide element representing the start point on the neighboring level within the same column, without being routed through other columns.

As well known in the art, a non-inductive wound resistor of a small residual inductance can be obtained using folding winding (Ayston-Perry winding). The folding winding can be established for the connection of the bridge plates by the above construction of the invention wherein the difference in height between individual zinc oxide elements on one level of individual columns and individual zinc oxide elements on the neighboring level of individual columns is substantially identical for the respective columns, and individual zinc oxide elements on the neighboring level are interconnected together by bridge plates in inverse directional relationship to the interconnection set up for the one level, starting from the end point of the interconnection of the zinc oxide elements on the one level and routing through the start point represented by a zinc oxide element on the neighboring level of the same column having that end point. Accordingly, the direction of current flowing through the bridge plates on the one level becomes inverse to the direction of current flowing through the bridge plates on the neighboring level to permit magnetic flux fields due to the currents to mutually cancel out and reduce the residual inductance of the arrester as a whole. This can suppress an increase in limit voltage of arrester due to the residual inductance under the application of impulse voltage so as to stabilize the performance of the arrester.

Specifically, a plurality of columns respectively include a stack in which the zinc oxide element and the insulating spacer are stacked alternately, and they are juxtaposed. According to the invention, the zinc oxide element and insulating spacer are respectively standardized and corresponding parts of substantially indentical shape, size and thickness can be used, thereby contributing to promoted simplification and speed-up of the production of the arrester.

DESCRIPTION OF THE PREFERRED EMBODIMENTS

Figure 1A:
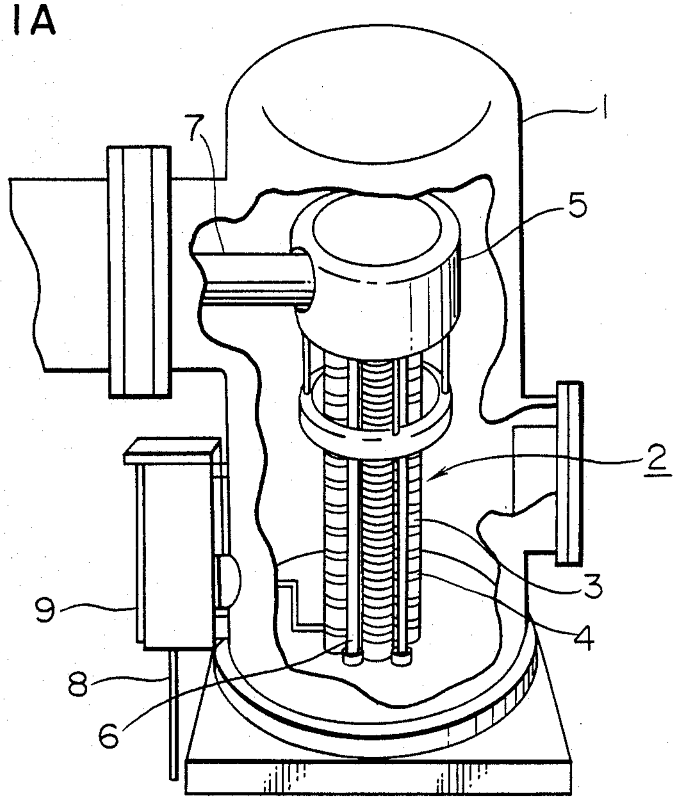
FIG. 1A is a partly exploded perspective view showing the overall construction of an arrester of the invention.

FIG. 1A illustrates, in partly exploded perspective view form, the overall construction of a grounding tank type arrester according to the invention. A plurality of columns 2 stand upright inside a grounding tank 1 containing an insulating medium ($SF_6$ gas). Each of the columns 2 includes a plurality of elements made of zinc oxide and having a non-linear voltage/current characteristic and a plurality of insulating spacers 4 which are stacked together with the zinc oxide elements in such a manner that each insulating spacer is interposed between adjacent zinc oxide elements concentrically therewith.

A shield 5 supported on the columns 2 on their high voltage side is used to mitigate an electric field applied to the columns 2 and cause voltage to be uniformly shared by the columns 2. Insulating rods 6 reinforce the support structure for the columns 2. A high current applied to a conductor 7 is led to a grounding wire 8 through the columns 2 while being measured in its value by means of a measuring instrument 9.

Figure 1B:
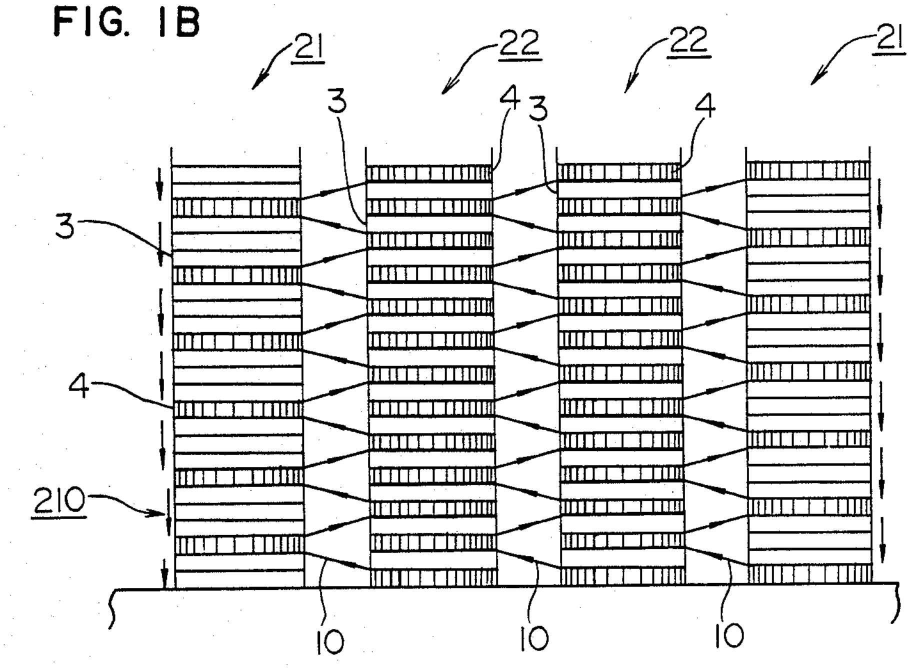
FIG. 1B is a diagram illustrating the construction of columns applied to the FIG. 1A arrester and including zinc oxide elements and the interconnection between the columns.

As best seen in FIG. 1B, the columns 2 of the FIG. 1A arrester are sorted into current folding columns 21 and current pass columns 22. Each current folding column 21 includes a plurality of stack sets of an element unit 210 and one insulating spacer 4, the element unit having a series connection of three of upper-level, intermediate-level, and lower-level zinc oxide elements 3, and the plural stack sets are stacked in regular sequence so that one element unit and one insulating spacer are stacked alternately. Each current pass column 22 includes a plurality of stack sets of one zinc oxide element 3 and one insulating spacer 4 and the plural stack sets are stacked in regular sequence so that one element 3 and one spacer 4 are stacked alternately. Bridge conductor plates 10 electrically connect the zinc oxide elements 3 of one column 2 to those of the adjacent column 2.

Figure 2:
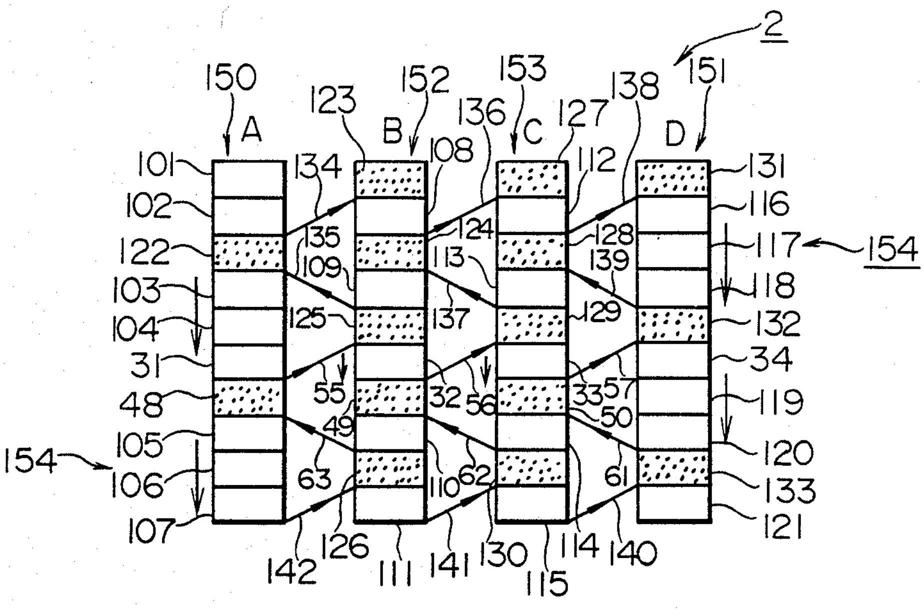
FIG. 2 is an expanded view showing part of a first embodiment of the invention.
Figure 3:
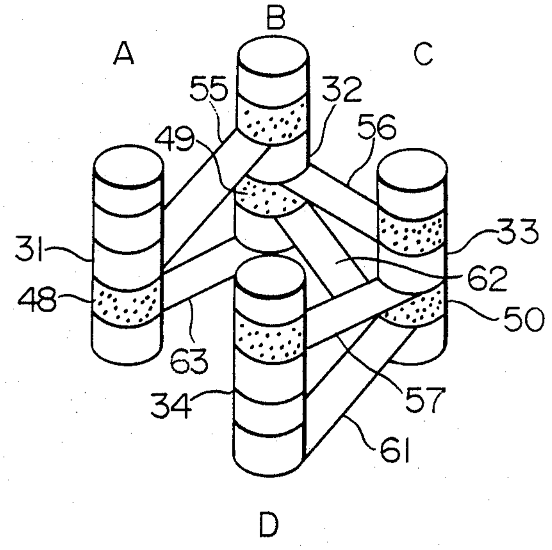
FIG. 3 is a perspective view showing part of the FIG. 2 embodiment.

Referring to FIGS. 2 and 3, there is illustrated an arrangement of the columns according to a first embodiment of the invention.

FIG. 2 particularly shows, in expanded form, the arrangement of four columns A, B, C and D of stacked zinc oxide elements and insulating spacers which is a portion of essential part of the grounding tank type arrester. FIG. 3 particularly shows, in perspective view form, part of the FIG. 2 arrangement, wherein the four columns A, B, C and D stand at four corners of a square. As shown, the arrangement of the four columns A, B, C and D has zinc oxide elements 31 to 34, 101 to 121 and insulating spacers 48 to 50, 122 to 133. The difference in height between the zinc oxide element 31 on one level and the zinc oxide element 105 on the neighboring level within the column A, the difference in height between the zinc oxide element 32 on the one level and the zinc oxide element 110 on the neighboring level within the column B, the difference in height between the zinc oxide element 33 on the one level and the zinc oxide element 114 on the neighboring level within the column C, and the difference in height between the zinc oxide element 34 on the one level and the zinc oxide element 120 on the neighboring level within the column D are substantially identical to each other. Similarly, the difference in heigh between a zinc oxide element on any level and a zinc oxide element on the neighboring level is substantially identical for the respective columns A, B, C and D.

The zinc oxide elements 31 to 34 on the same level are interconnected together by bridge conductor plates 55 to 57 each of which is inclined to bridge the bottom surface of an upstream element and the top surface of a downstream element, as shown in FIGS. 2 and 3. The insulating spacer and bridge conductor plate are respectively standardized in size and corresponding parts of identical size can be used. Advantageously, this prevents confused use of parts during assembling.

Current in the arrester flows through the zinc oxide elements and bridge plates interconnecting the zinc oxide elements. As is clear from FIG. 2, the columns A and D act as the column for folding the current flow in which the number of zinc oxide elements is larger, and the occupation percentage of the elements is larger in the current folding column than in the current pass column.

Since the current starting from the zinc oxide element 31 flows to the zinc oxide element 105 through the elements 32, 33, 34, 119, 120, -----, the direction of current in the bridge plates 55 to 57 is inverse to the direction of current in the bridge plates 61 to 63 for the neighboring level and consequently, magnetic flux fields generated by currents respectively flowing through the bridge plates 55 to 57 and the bridge plates 61 to 63 act to mutually cancel out.

In FIG. 2, the columns 2 are sorted into two current folding columns 150 and 151 and two current pass columns 152 and 153. Each current folding column 150 or 151 includes a plurality of stack sets of an element unit such as represented by 154 and one insulating spacer, the element unit having a series connection of three of upper-level, intermediate-level and lower-level zinc oxide elements 105, 106, 107 or 116, 117, 118, and the plural stack sets are stacked in regular sequence. Each current pass column 152 or 153 includes a plurality of stack sets of one zinc oxide element and one insulating spacer and the plural stack sets are stacked in regular sequence.

Individual zinc oxide elements of the first and second current pass columns 152 and 153 are flush with the upper-level zinc oxide element 105, 116 or with lower-level zinc oxide element 107, 118 of the respective element units 154 of the first and second current folding columns 150 and 151.

The direction of current flowing through the bridge conductor plate 63 for connecting the upper-level zinc oxide element 105 of element unit 154 of the first current folding column 150 and the zinc oxide element 110 of first current pass column 152 which is flush with the upper-level zinc oxide element 105 is inverse to the direction of current flowing through the bridge conductor plate 142 for connecting the lower-level zinc oxide element 107 of element unit 154 of the first current folding.

The direction of current flowing through a bridge conductor plate, such as represented by 136, for connecting together the zinc oxide elements on one level of the first and second current pass columns 152 and 153 is inverse to the direction of current flowing through a bridge conductor plate, such as 137, for connecting together the zinc oxide elements on the neighboring level of the first and second current pass columns 152 and 153. Reference numerals 134, 135, 140 and 141 designate the remaining bridge conductor plates.

According to experiments on arresters for 500 KV system, it has been proven that the residual inductance which amounts up to about 4 μH in the conventional, toroidally connected arrester can be reduced to about 2.5 μH in the arrester in accordance with teachings of the invention. The thus decreased residual inductance can reduce the voltage drop due to current waveform generated sympathetically with generation of impulse voltage and consequently can reduce an increase in limit voltage of the arrester.

Advantageously, according to the invention, the height of the arrester can be decreased by using the four columns including the zinc oxide elements, the parts can be standardized in dimension to permit the use of parts of identical size and in performance, the residual inductance can be minimized.

Figure 4:
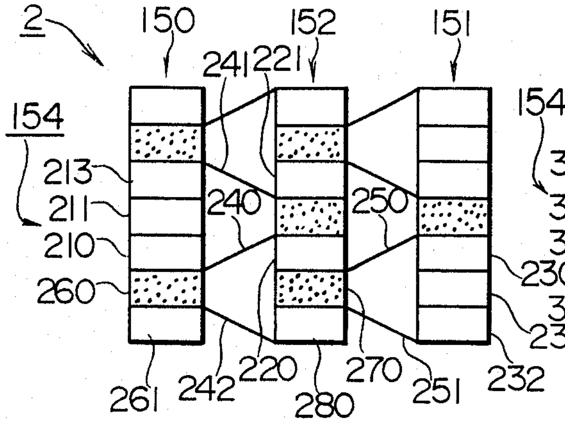
FIGS. 4 and 5 illustrate second and third embodiments of the invention, respectively.
Figure 5:
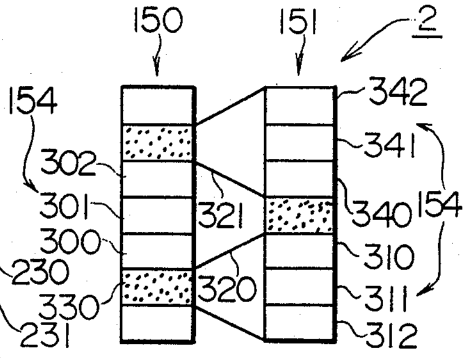

FIG. 4 shows a second embodiment of the invention wherein three columns including zinc oxide elements are used and FIG. 5 shows a third embodiment of the invention which uses two columns including zinc oxide elements. The configuration shown in FIGS. 4 and 5 may be adopted by matching the number of necessary zinc oxide elements to the case where voltage of a system to which the arrester is applied is low.

Referring to FIG. 4, the three columns 2 are sorted into two current folding columns 150 and 151 and one current pass column 152. Each current folding column 150 or 151 includes a plurality of stack sets of an element unit 154 and one insulating spacer, the element unit having a series connection of three of upper-level, intermediate-level and lower-level zinc oxide elements, and the plural stack sets are stacked in regular sequence. Each current pass column 152 includes a plurality of stack sets of one zinc oxide element and one insulating spacer and the plural stack sets are stacked in regular sequence.

A zinc oxide element 220 of the current pass column 152 is flush with a lower-level zinc oxide element 210 of element unit 154 of the first current folding column 150 and with an upper-level zinc oxide element 230 of element unit 154 of the second current folding column 151. A zinc oxide element 280 of the current pass column 152 is flush with an upper-level zinc oxide element 261 of element unit of the first current folding column 150 and with a lower-level zinc oxide element 232 of element unit of the second current folding column 151.

The direction of current flowing through a bridge conductor plate 241 for connecting an upper-level zinc oxide element 213 of element unit 154 of the first current folding column 150 and a zinc oxide element 221 of current pass column 152 which is flush with the upper-level zinc oxide element 213 is inverse to the direction of current flowing through a bridge conductor plate 240 for connecting the lower-level zinc oxide element 210 of element unit 154 of the first current folding column 150 and the zinc oxide element 220 of current pass column 152 which is flush with the lower-level zinc oxide element 210. Similarly, the direction of current flowing through a bridge conductor plate 250 for connecting the upper-level zinc oxide element 230 of element unit 154 of the second current folding column 151 and the zinc oxide element 220 of current pass column 152 which is flash with the upper-level zinc oxide element 230 is inverse to the direction of current flowing through a bridge conductor plate 251 for connecting the lower-level zinc oxide element 232 of the second current folding column 151 and the zinc oxide element 280 of current pass column 152 which is flush with the lower-level zinc oxide element 232. In FIG. 4, reference numerals 211, 231 designate intermediate-level zinc oxide elements, 260, 270 insulating spacers and 242 another bridge conductor plate.

Referring to FIG. 5, the two columns 2 correspond to two current folding columns 150 and 151. Each current folding column 150 or 151 includes a plurality of stack sets of an element unit 154 and one insulating spacer such as represented by 330, the element unit having a series connection of three of upper-level, intermediate-level and lower-level zinc oxide elements such as represented by 302, 301 and 300, and the plural stack sets are stacked in regular sequence.

The upper-level zinc oxide element 302 of element unit 154 of the first current folding column 150 is flush with a lower-level zinc oxide element 340 of element unit 154 of the second current folding column 151, and the lower-level zinc oxide element 300 of element unit 154 of the first current folding column 150 is flush with an upper-level zinc oxide element 310 of element unit 154 of the second current folding column 151.

The direction of current flowing through a bridge conductor plate 321 for connecting the upper-level zinc oxide element 302 of element unit 154 of the first current folding column 150 and the lower-level zinc oxide element 340 of element unit 154 of second current folding column 151 which is flush with the upper-level zinc oxide element 302 is inverse to the direction of current flowing through a bridge conductor plate 320 for connecting the lower-level zinc oxide element 300 of element unit 154 of the first current folding column 150 and the upper-level zinc oxide element 310 of element unit 154 of second current folding column 151 which is flush with the lower-level zinc oxide element 300. In FIG. 5, reference numerals 311 and 341 designate intermediate-level zinc oxide elements, 312 a lower-level zinc oxide element and 342 an upper-level zinc oxide element.

Figure 6:
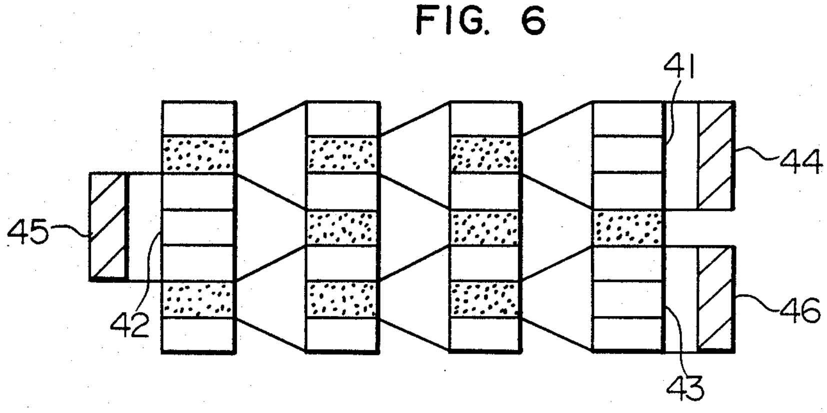
FIGS. 6, 7 and 8 illustrate fourth, fifth and sixth embodiments of the invention, respectively.
Figure 7:
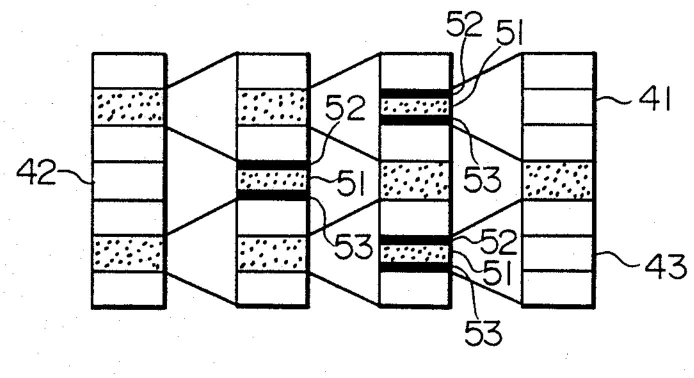
Figure 8:
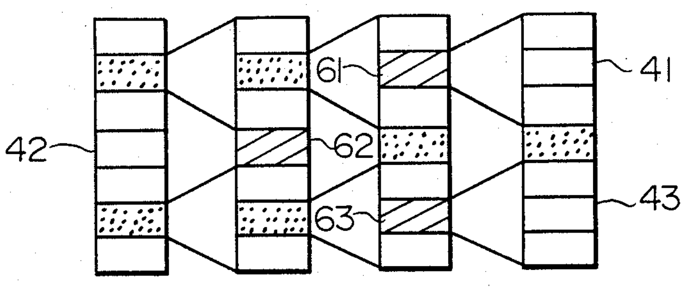
Figure 9A:
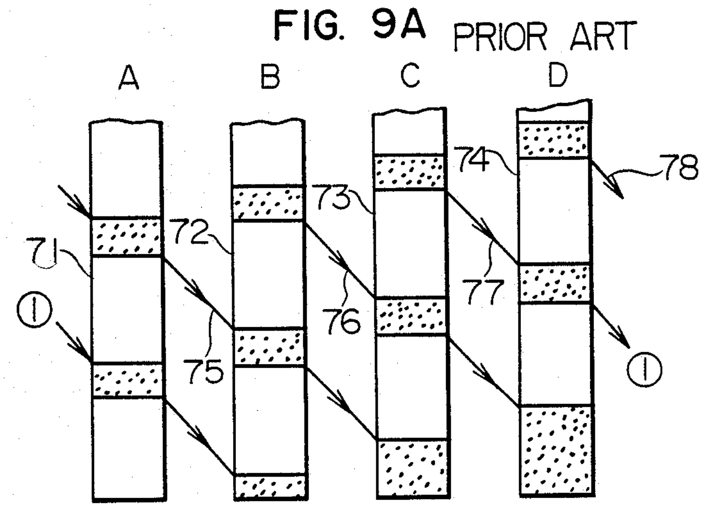
FIG. 9A PRIOR ART
FIGS. 9A and 9B illustrate a prior art arrester.
Figure 9B:
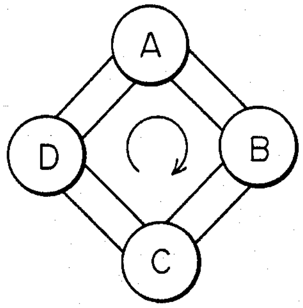
FIG. 9B PRIOR ART

FIGS. 6, 7 and 8 show fourth, fifth and sixth embodiments of the invention wherein balance of voltages applied to zinc oxide elements through stray capacitance and shared by the zinc oxide elements can be improved. In the fourth embodiment shown in FIG. 6, capacitors 44 to 46 are connected in parallel with element units 41 to 43 of current folding columns including a number of zinc oxide elements, in order to eliminate the influence of stray capacitance. In the fifth embodiment shown in FIG. 7, in place of the parallel connection of capacitors in the FIG. 6 embodiment, a thin insulating capacitor 51, to be connected in parallel with the element unit, of the current pass column is sandwiched by electrodes 52 and 53 to obtain the same effect as in the fourth embodiment. In the sixth embodiment shown in FIG. 8, insulating spacers 61 to 63 of current pass columns which are adjacent to element units 41 to 43 of the current folding columns are made to have larger electrostatic capacitance than that of the remaining insulating spacers in the arrangement of columns, thus improving balance of voltages shared by the zinc oxide elements.

We claim:

1. A grounding tank type arrester having a grounding tank which contains an insulating medium and in which a plurality of columns each including a stack in which an element made of zinc oxide having a non-linear voltage/current characteristic and an insulating spacer are stacked alternately, said plurality of columns being juxtaposed, and individual zinc oxide elements on each level of individual columns are sequentially interconnected together by bridge plates to provide a series connection as a whole, wherein (a) the difference in height, referenced to the bottom of said grounding tank, between individual zinc oxide elements on one level of individual columns which are interconnected together by bridge plates and individual zinc oxide elements on the neighboring level of individual columns which are interconnected together by bridge plates is substantially identical for the respective columns;

(b) individual zinc oxide elements on the one level of individual columns are sequentially interconnected together by a bridge plate between adjoining columns, starting from a first start point represented by a zinc oxide element on the one level of a column which is upstream for current flowing through the bridge plates and ending at a first end point represented by a zinc oxide element on the one level of a column which excludes said column having the first start point and which is the most downstream for the current, and individual zinc oxide elements on the neighboring level of individual columns are sequentially interconnected together by a bridge plate between adjoining columns in inverse directional relationship to the sequential interconnection set up for the one level, starting from a second start point represented by a zinc oxide element on the neighboring level of said column having said first end point and ending at a second end point represented by a zinc oxide element on the neighboring level of said column having said first start point; and (c) the zinc oxide element representing the end point is electrically connected to the downstream zinc oxide element representing the start point on the neighboring level within the same column, without being routed through other columns.

2. A grounding tank type arrester according to claim 1 wherein the height of individual zinc oxide elements on the same level of individual columns which are interconnected together by the bridge plates is substantially identical for the respective columns when referenced to the bottom of said grounding tank.

3. A grounding tank type arrester according to claim 1 wherein one bridge plate bridges the bottom surface of a zinc oxide element of a column which is upstream for the current flowing through the bridge plates and the top surface of a zinc oxide element of the adjoining downstream column.

4. A grounding tank type arrester according to claim 1 wherein the number of said plural columns is three or more, and a capacitor is connected in parallel to a group of zinc oxide elements which are adjacent to each other within the same column and electrically interconnected together without being routed through other columns.

5. A grounding tank type arrester according to claim 1 wherein the number of said plural columns is three or more, and an insulating spacer electrically connected in parallel to a group of zinc oxide elements which are adjacent to each other within the same column and electrically interconnected together without being routed through other columns has a capacitance which is larger than that of other insulating spacers.

6. A grounding tank type arrester comprising:

a grounding tank containing an insulating medium;

three columns disposed inside said grounding tank and each including a stack in which a plurality of elements made of zinc oxide having a non-linear voltage/current characteristic and a plurality of insulating spacers respectively interposed between said zinc oxide elements concentrically therewith are stacked; and a plurality of bridge conductor plates for electrically interconnecting a zinc oxide element of one column and a zinc oxide element of the adjoining column, wherein said three columns are sorted into two current folding columns and one current pass column, each current folding column includes a plurality of stack sets of an element unit and one insulating spacer, said element unit having a series connection of three of upper-level, intermediate-level and lower-level zinc oxide elements, the plural stack sets of current folding column are stacked in regular sequence so that one element unit and one insulating spacer are stacked alternately, said current pass column includes a plurality of stack sets of one zinc oxide element and one insulating spacer, and the plural stack sets of current pass column are stacked in regular sequence so that one element and one spacer are stacked alternately;

zinc oxide element of said current pass column is flush with either an upper-level zinc oxide element or a lower-level zinc oxide element of the respective element units of first and second current folding columns; and the direction of current flowing through a bridge conductor plate for connecting an upper-level zinc oxide element of the respective element units of the first and second current folding columns and a zinc oxide element of current pass column which is flush with that upper-level zinc oxide element is inverse to the direction of current flowing through a bridge conductor plate for connecting a lower-level zinc oxide element of the respective element units of the first and second current folding columns and a zinc oxide element of current pass column which is flush with that lower-level zinc oxide element.

7. A grounding tank type arrester according to claim 6 wherein a capacitor is connected in parallel to the respective element units of said first and second current folding columns.

8. A grounding tank type arrester according to claim 6 wherein a zinc oxide element of said current pass column is sandwiched by electrodes to form a capacitor connected in parallel to said element unit of either of said first current folding column and said second current folding column.

9. A grounding tank type arrester comprising:

a grounding tank containing an insulating medium;

four columns disposed inside said grounding tank and each including a stack in which a plurality of elements made of zinc oxide having a non-linear voltage/current characteristic and a plurality of insulating spacers respectively interposed between said zinc oxide elements concentrically therewith are stacked; and a plurality of bridge conductor plates for electrically interconnecting a zinc oxide element of one column and a zinc oxide element of the adjoining column, wherein said four columns are sorted into two current folding columns and two current pass columns, each current folding column includes a plurality of stack sets of an element unit and one insulating spacer, said element unit having a series connection of three of upper-level, intermediate-level and lower-level zinc oxide elements, the plural stack sets of current folding column are stacked in regular sequence so that one element unit and one insulating spacer are stacked alternately, each current pass column includes a plurality of stack sets of one zinc oxide element and one insulating spacer, and the plural stack sets of current pass column are stacked in regular sequence so that one element and one spacer are stacked alternately;

a zinc oxide element of respective first and second current pass columns is flush with either an upper-level zinc oxide element or a lower-level zinc oxide element of the respective element units of first and second current folding columns;

the direction of current flowing through a bridge conductor plate for connecting an upper-level zinc oxide element of the element unit of first current folding column and a zinc oxide element of first current pass column which is flush with that upper-level zinc oxide element is inverse to the direction of current flowing through a bridge conductor plate for connecting a low-level zinc oxide element of the element unit of first current folding column and a zinc oxide element of first current pass column which is flush with that lower-level zinc oxide element;

the direction of current flowing through a bridge conductor plate for connecting an upper-level zinc oxide element of the element unit of second current folding column and a zinc oxide element of second current pass column which is flush with that upper-level zinc oxide element is inverse to the direction of current flowing through a bridge conductor plate for connecting a lower-level zinc oxide element of the element unit of second current folding column and a zinc oxide element of second current pass column which is flush with that lower-level zinc oxide element; and the direction of current flowing through a bridge conductor plate for connecting together zinc oxide elements of first and second current pass columns which are on one level is inverse to the direction of current flowing through a bridge conductor plate for connecting together zinc oxide elements of first and second current pass columns which are on the neighboring level.

10. A grounding tank type arrester according to claim 9 wherein a capacitor is connected in parallel to the respective element units of said first and second current folding columns.

11. A grounding tank type arrester according to claim 9 wherein a zinc oxide element of each of said first and second current pass columns is sandwiched by electrodes to form a capacitor connected in parallel to said element unit of either of said first current folding column and said second current folding column.

12. A grounding tank type arrester comprising:

a grounding tank containing an insulating medium;

two columns disposed inside said grounding tank and each including a stack in which a plurality of elements made of zinc oxide having a non-linear voltage/current characteristic and a plurality of insulating spacers respectively interposed between said zinc oxide elements concentrically therewith are stacked; and a plurality of bridge conductor plates for electrically interconnecting a zinc oxide element of one column and a zinc oxide element of the adjoining column, wherein said two columns correspond to two current folding columns, each current folding column includes a plurality of stack sets of an element unit and one insulating spacer, said element unit having a series connection of three of upper-level, intermediate-level and lower-level zinc oxide elements, the plural stack sets are stacked in regular sequence so that one element unit and one insulating spacer are stacked alternately;

an upper-level zinc oxide element of the element unit of first current folding column is flush with a lower-level zinc oxide element of the element unit of second current folding column, and a lower-level zinc oxide element of the element unit of said first current folding column is flush with an upper-level zinc oxide element of the element unit of said second current folding column; and the direction of current flowing through a bridge conductor plate for connecting an upper-level zinc oxide element of the element unit of said first current folding column and a lower-level zinc oxide element, flush with that upper-level zinc oxide element, of the element unit of said second current folding column is inverse to the direction of current flowing through a bridge conductor plate for connecting a lower-level zinc oxide element of the element unit of said first current folding column and an upper-level zinc oxide element, flush with that lower-level zinc oxide element, of the element unit of said second current folding column.

13. A grounding tank type arrester according to claim 12 wherein a capacitor is connected in parallel to the respective element units of said first and second current folding columns.

* * * * *